(12) United States Patent
Varadarajan et al.

(10) Patent No.: US 9,627,004 B1
(45) Date of Patent: Apr. 18, 2017

(54) VIDEO FRAME ANNOTATION

(71) Applicant: Google Inc., Mountain View, CA (US)

(72) Inventors: Balakrishnan Varadarajan, Sunnyvale, CA (US); Sanketh Shetty, Sunnyvale, CA (US); Apostol Natsev, Sunnyvale, CA (US); Nitin Khandelwal, Mitpitas, CA (US); Weilong Yang, Fremont, CA (US); Sudheendra Vijayanarasimhan, Mountain View, CA (US); WeiHsin Gu, Redwood City, CA (US); Nicola Muscettola, Sunnyvale, CA (US)

(73) Assignee: Google Inc., Mountain View, CA (US)

( * ) Notice: Subject to any disclaimer, the term of this patent is extended or adjusted under 35 U.S.C. 154(b) by 7 days.

(21) Appl. No.: 14/883,461

(22) Filed: Oct. 14, 2015

(51) Int. Cl.
| | | |
|---|---|---|
| H04N 9/80 | (2006.01) | |
| H04N 5/77 | (2006.01) | |
| G11B 27/10 | (2006.01) | |
| G06K 9/00 | (2006.01) | |
| G06K 9/46 | (2006.01) | |
| G06F 17/30 | (2006.01) | |
| G06F 17/24 | (2006.01) | |
| H04N 21/2743 | (2011.01) | |
| H04N 21/234 | (2011.01) | |
| H04N 21/235 | (2011.01) | |

(52) U.S. Cl.
CPC ............ *G11B 27/10* (2013.01); *G06F 17/241* (2013.01); *G06F 17/3082* (2013.01); *G06F 17/30799* (2013.01); *G06K 9/00744* (2013.01); *G06K 9/4642* (2013.01); *H04N 21/2353* (2013.01); *H04N 21/23418* (2013.01); *H04N 21/2743* (2013.01)

(58) Field of Classification Search
CPC .. G11B 27/10; G06K 9/00744; G06K 9/4642; G96F 17/30799; G96F 17/241; G96F 17/3082; H04N 21/2743; H04N 21/23418; H04N 21/2353
USPC ........ 386/241, 239, 226, 230, 223, 248, 278
See application file for complete search history.

(56) References Cited

U.S. PATENT DOCUMENTS

| | | | |
|---|---|---|---|
| 8,082,235 B1 * | 12/2011 | Dasilva | ............ G06F 17/30817 707/691 |
| 8,789,093 B2 * | 7/2014 | Medina | ................ G08B 13/196 348/143 |

* cited by examiner

*Primary Examiner* — Robert Chevalier
(74) *Attorney, Agent, or Firm* — Fenwick & West LLP

(57) ABSTRACT

A system and methodology provide for annotating videos with entities and associated probabilities of existence of the entities within video frames. A computer-implemented method selects an entity from a plurality of entities identifying characteristics of a video item, where the video item has associated metadata. The computer-implemented method receives probabilities of existence of the entity in video frames of the video item, and selects a video frame determined to comprise the entity responsive to determining the video frame having a probability of existence of the entity greater than zero. The computer-implemented method determines a scaling factor for the probability of existence of the entity using the metadata of the video item, and determines an adjusted probability of existence of the entity by using the scaling factor to adjust the probability of existence of the entity. The computer-implemented method labels the video frame with the adjusted probability of existence.

21 Claims, 3 Drawing Sheets

VIDEO FRAME ANNOTATION

BACKGROUND OF THE INVENTION

Field of the Invention

The present application is related to video processing, and more particularly, to labelling video frames using metadata.

Description of the Background Art

Media hosting services can host millions of media content items (also referred to as "media items", or simply "items"), such as music, movies, e-books, news articles, user generated content, and the like. Typically, users of the media hosting service can browse or search media content items by providing keywords or search terms to search the information describing the media content items such as titles, summaries of the media content items, objects of interest, etc. Due to the large number of media content items hosted by the media hosting service, many media content items may be returned responsive to user searches. Consequently, it can be difficult for the users to assess which of the hundreds or thousands of media content items in the set of search results are of the greatest relevance to them. In addition, it may be extremely difficult for a user to pinpoint the portions of a media content item that are most relevant.

Additional information may be provided to users to help the users to assess the relevance of the search results. For example, metadata associated with the video content may allow users to assess the relevance of the video content items such as images from the video content items, authors of the video content items, length of the video content items, or information indicating the popularity of the video content items, but such metadata may be lacking in many cases (e.g., if a video submitter did not provide it), or inaccurate (e.g., in the case of intentionally misleading "spam" metadata). Thus, even with the additional information describing the video content items, it is often difficult for the user to determine whether the video content items contain content that is relevant to their search query.

SUMMARY OF THE INVENTION

The embodiments described herein provide methods, computer program products, and systems for annotating videos with entities and associated probabilities of existence of the entities within video frames. In one embodiment, a computer-implemented method selects an entity from a plurality of entities identifying characteristics of a video item, where the video item has associated metadata. The computer-implemented method receives probabilities of existence of the entity in video frames of the video item, and selects a video frame determined to comprise the entity responsive to determining the video frame having a probability of existence of the entity greater than zero. The computer-implemented method determines a scaling factor for the probability of existence of the entity using the metadata of the video item, and determines an adjusted probability of existence of the entity by using the scaling factor to adjust the probability of existence of the entity. The computer-implemented method labels the video frame with the adjusted probability of existence.

In one embodiment, a non-transitory computer-readable medium comprising computer program instructions executable by a processor. The computer program instructions comprise instructions for selecting an entity from a plurality of entities identifying characteristics of a video item, where the video item has associated metadata. The computer program instructions comprise instructions for receiving probabilities of existence of the entity in video frames of the video item, and instructions for selecting a video frame determined to comprise the entity responsive to determining the video frame having a probability of existence of the entity greater than zero. The computer program instructions comprise instructions for determining a scaling factor for the probability of existence of the entity using the metadata of the video item, and instructions for determining an adjusted probability of existence of the entity by using the scaling factor to adjust the probability of existence of the entity. The computer program instructions comprise instructions for labeling the video frame with the adjusted probability of existence.

In one embodiment, a system comprises a processor for executing computer program instructions and a non-transitory computer-readable storage medium comprising computer program instructions executable by the processor. The computer program instructions comprise instructions for selecting an entity from a plurality of entities identifying characteristics of a video item, where the video item has associated metadata. The computer program instructions comprise instructions for receiving probabilities of existence of the entity in video frames of the video item, and instructions for selecting a video frame determined to comprise the entity responsive to determining the video frame having a probability of existence of the entity greater than zero. The computer program instructions comprise instructions for determining a scaling factor for the probability of existence of the entity using the metadata of the video item, and instructions for determining an adjusted probability of existence of the entity by using the scaling factor to adjust the probability of existence of the entity. The computer program instructions comprise instructions for labeling the video frame with the adjusted probability of existence.

The features and advantages described in this summary and the following detailed description are not all-inclusive. Many additional features and advantages will be apparent to one of ordinary skill in the art in view of the drawings, specification, and claims hereof.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

System Architecture

Figure 1:
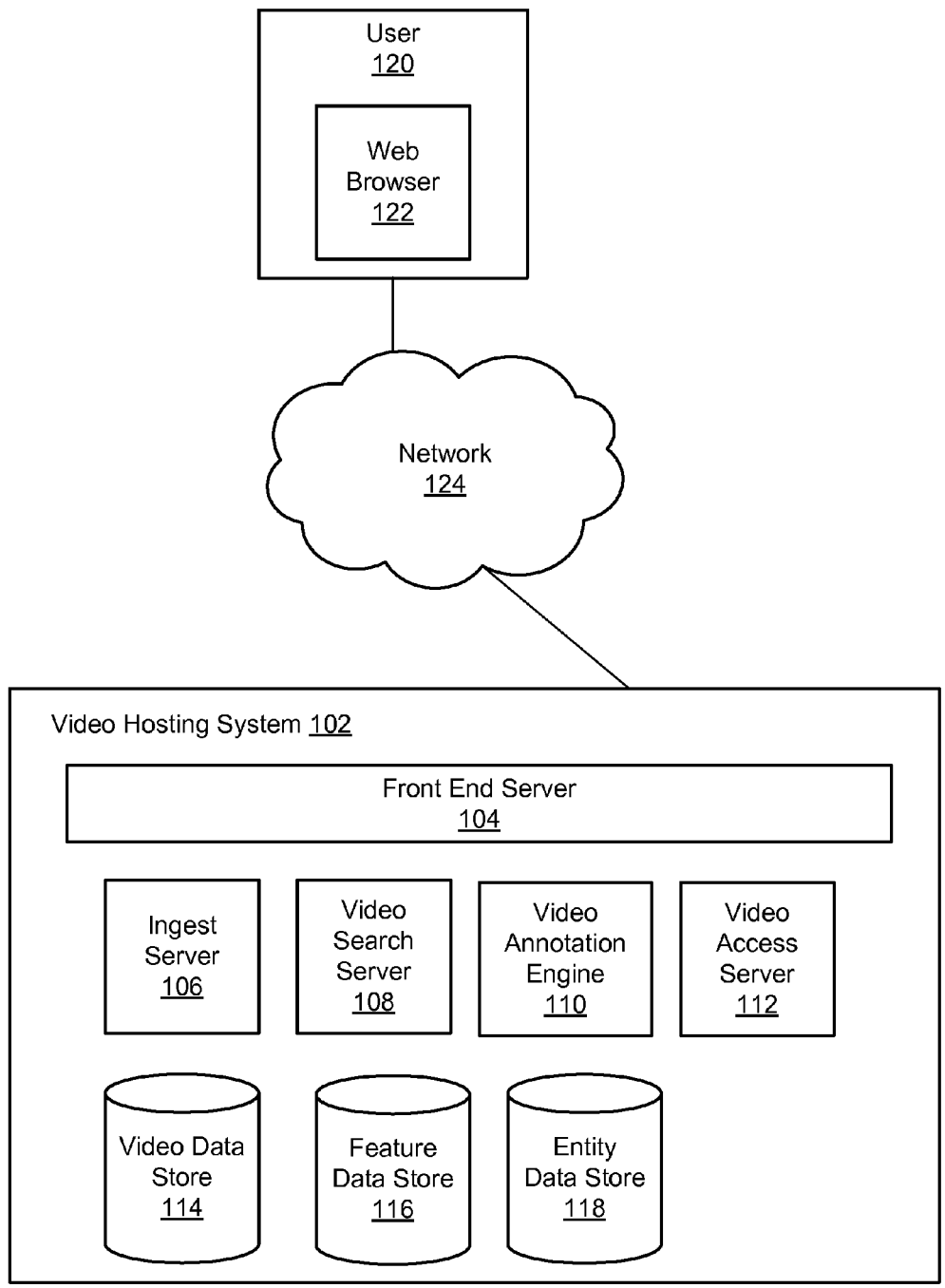
FIG. 1 is a high-level block diagram of a video hosting system server providing video annotation according to one embodiment.

FIG. 1 is a high-level block diagram of a system providing annotation of videos with probabilities of existence of entities at each video frame according to one embodiment. FIG. 1 illustrates a video hosting system 102 and a user 120 connected by a network 124. The user 120 represents an entity that can access videos contained within the video hosting system 102. A user 120 can access a video from the video hosting system 102 by browsing a catalog of videos, conducting searches using keywords, reviewing play lists from other users or the system administrator (e.g., collections of videos forming channels), or viewing videos associated with particular user groups (e.g., communities). Additionally, in some embodiments, the video hosting system 102 is adapted to receive videos for storage in order to enable the sharing of the videos with other users.

In one embodiment, the user 120 uses a computer system to communicate with the video hosting system 102 over the network 124. In one embodiment, the computer system is a personal computer executing a web browser 122 such as MICROSOFT INTERNET EXPLORER or GOOGLE CHROME that allows the user to view web pages and videos provided by the video hosting system 102. In one embodiment, the web browser 122 includes a video player (e.g., Flash™ from Adobe Systems, Inc.). The user 120 may utilize a network-capable device other than a computer system, such as a smart phone, a tablet, a car, a television "set-top box," etc. Although FIG. 1 illustrates only a single user, it should be understood that many users (e.g., millions) can communicate with the website at any time. The single user 120 is illustrated in order to simplify and clarify the present description.

The network 124 represents the communication pathways between the user and the video hosting system 102. In one embodiment, the network 124 is the Internet, but may also be any network, including but not limited to a LAN, a MAN, a WAN, a mobile, wired or wireless network, a cloud computing network, a private network, or a virtual private network, and any combination thereof. In addition, all or some of links can be encrypted using conventional encryption technologies such as the secure sockets layer (SSL), Secure HTTP and/or virtual private networks (VPNs). In another embodiment, the entities can use custom and/or dedicated data communications technologies instead of, or in addition to, the ones described above.

The video hosting system 102 represents any system that allows users to access video content via searching and/or browsing interfaces. The sources of videos can be from user uploads of videos, searches or crawls of other websites or databases of videos, or the like, or any combination thereof. For example, in one embodiment a video hosting system 102 can be configured to allow for user uploads of content; in another embodiment a video hosting system 102 can be configured to only obtain videos from other sources by crawling such sources or searching such sources in real time.

A suitable video hosting system 102 for implementation of the system is the YOUTUBE™ website; other video hosting websites are known as well, and can be adapted to operate according to the teaching disclosed herein. It will be understood that the term "website" represents any computer system adapted to serve content using any internetworking protocols, and is not intended to be limited to content uploaded or downloaded via the Internet or the HTTP protocol. In general, functions described in one embodiment as being performed on the server side can also be performed on the client side in other embodiments if appropriate. In addition, the functionality attributed to a particular component can be performed by different or multiple components operating together.

The video hosting system 102 comprises a front end server 104, an ingest server 106, a video search server 108, a video annotation engine 110, a video access server 112, a video data store 114, a feature data store 116, and an entity data store 118. Many conventional features, such as firewalls, load balancers, application servers, failover servers, site management tools and so forth are not shown so as not to obscure the features of the system.

The front end server 104 handles all communication with the user via the network 124. The front end server receives requests from users and communicates with the other servers of the video hosting system 102 in order to process the requests. The front end server 104 is further configured to monitor user interactions with the video hosting system 102. For example, if a user clicks on a web page, views a video, makes a purchase, opens a document, fills a web-based form, the front end server 104 monitors these interactions. The front end server 104 may be further configured to transmit and present the requested video and related video links to the user on a webpage. The requested video is streamed by the front end server 104 to the user. One or more related video links appear on the webpage where the requested video is playing, such that the related video link can be selected by a user 120 in order to view the related videos.

Any content received via the network 124 from a user for posting to the video hosting system 102 is passed on to the ingest server 106 for processing. The processing of the video file includes assigning an identification number to the newly received video file. Other steps of processing the video file may include formatting (e.g., transcoding), compressing, metadata tagging, content analysis, and/or other data processing methods. The user transmits a form along with the video file transmitted to the video hosting system 102. The user may include in the form information that describes the video (e.g., title, description, and tag information). The form information may also include an indication of the media type, which for uploaded videos would always be the "video" type. The ingest server 106 stores the processed video file in a video data store 114 and stores the information included in the form as metadata of the video file. The video data store 114 is the storage system where the video files transmitted to the video hosting system 102 are stored. A video may be accompanied by icons or thumbnail views, associated metadata, such as title, author, tags, description, comments, and rating.

The ingest server 106 may generate features used to characterize the media content items stored in the video data store 114. Example features include lego centrality, lego relevance, topicality, and cowatch. Lego centrality is the video level centrality score of an entity. Lego relevance is the video level relevance score of an entity. Lego centrality and relevance may be obtained from the title and description of a video. Topicality is a score summarizing annotations of a webpage hosting the video. Cowatch are centrality, relevance, and topicality scores of other videos co-watched with the video. Features may be stored with media content items as metadata, for example in the video data store 114. The ingest server 106 may further store the features in the feature data store 116. An index may be maintained in the video data store 114 that associates each video file stored in the video data store with the features stored in the feature data store 116 that are associated with the video file. In one embodiment, for each video frame of a video file, the ingest server 106 generates features that characterize each video frame of the video file.

In addition, the ingest server 106 may identify entities associated with the video files stored in the video data store 114 and store the entities in the entity data store 118. Entities are text descriptors that identify characteristics of media content items, for example, actual things, ideas, or concepts that have meanings. For example, "pugs", "Machu Picchu", "philosophy", and "sleepy" are all examples of entities. Entities may be stored with media content items as metadata, for example in the video data store 114. In one embodiment, for each video file, the ingest server 106 identifies entities associated with each video frame of the video file. Each video frame of each video file may have one or more entities associated with it. For example, if a video clip depicted a pug staring at a croissant in Golden Gate Park, the entities stored as metadata might include "dog", "food", "San Francisco", "pug", "croissant", "hungry", and "Golden Gate Park", among others.

Entities may be associated with media content items when the media content items are ingested by the ingest server 106. The set of potential entities that can be associated with media content items may be derived from tags or other descriptive information provided by a user. For videos, entities may be derived from textual descriptions and metadata accompanying the videos, as well as closed captioning text present in the video, or by converting audio to text and then extracting entities from the text. For textual documents (e.g., web pages, emails, etc.), entities may be determined using term frequency analysis, semantic analysis, natural language processing, or other methods. An index is maintained in the video data store 114 that associates each entity with the set of content items to which the entity is identified. In addition, for each content item, there is maintained a list of the entities associated with the content item.

The ingest server 106 may determine probabilities of existence $x_{e,v}(t)$ of entities e at time t for the video v using machine learning techniques. A likelihood of an entity existing on a frame is determined. In some embodiments, the ingest server 106 determines the probabilities of existence $x_{e,v}(t)$ by using the features associated with the video file stored in the feature data store 116 and the entity data store 118. For example, the ingest server 106 determines the probability of existence $x_{e,v}(t)$ of an entity e being affected by one or more features associated with a video frame (i.e., at time t for the video). The probability distribution for the entity e defined over a space of possible features F is determined. The probability of existence $x_{e,v}(t)$ may be based on a fusion score of various features.

The video search server 108 processes any search query received by the front end server 104 from a user. The search query transmitted by the user to the front end server 104 includes search criteria, such as keywords that may identify videos the user is interested in viewing. For example, the search query might be the textual string "machu picchu". The video search server 108 may use the search criteria, for example, to query the metadata of and/or entities associated with all video files stored in the video data store 114 or to query the entity data store 118. The search results are the videos including entities that match the search query. For example, the search results for the search query "machu picchu" include video items that are annotated with the entity "machu picchu" that match the search query. The search results from the query are transmitted to the front end server 104, so that the search results can be presented to the user.

The video access server 112 receives from the front end server requests from users that wish to view (or play back) a specific video. From the user perspective, a user may submit a request for a video by browsing the different categories of the video hosting system 102 or by clicking on a link to a video from a search results webpage. The request transmitted by the user can include the identification number of the video the user wishes to view (which can be included automatically once the user clicks on the link for the video). The video access server 112 uses the identification number to search and locate where the video is stored in the video data store 114. The video access server 112 provides the video requested to the front end server 104.

The video annotation engine 110 annotates video files stored in the video data store 114 with entities. For a video file, the video annotation engine 110 may annotate each video file using probabilities of existence of the entities. For each video file stored in the video data store 114, the video annotation engine 110 labels each video frame of the video file with entities (if any) that exist in that frame, as well as the associated probabilities that those entities exist in the frame. To improve accuracy, the video annotation engine 110 adjusts the probabilities of existence of the entities. When probabilities of existence of entities are determined using frame-level features, some entities determined to exist in video frames by the ingest server 106 may in fact not exist in those frames. The video annotation engine 110 removes those entities from video frames prior to labeling video frames by (for example) using video-level metadata to support analysis of entities at the frame level. As such, the video frames are annotated more accurately because the likelihoods of entities existing on video frames are boosted due to the removal of likely-spurious entity determinations arrived at by frame-level analysis. Video-level metadata is metadata of video items, such as title, description, comments, and the like. To boost the accuracy of probabilities of existence of entities, the video annotation engine 110 may determine adjusted probabilities of existence $y_{e,v}(t)$ for entities that are determined to exist in video frames by using metadata of videos. That is, for a frame, the probabilities of existence are adjusted only for those entities of which the probabilities of existence $x_{e,v}(t)$ are greater than 0. The adjusted probabilities of existence $y_{e,v}(t)$ are determined based on probabilities of existence $x_{e,v}(t)$ of entities in video frames as well as metadata associated with video frames.

In some embodiments, the video annotation engine 110 averages the probabilities of existence of entities for multiple frames and labels these frames with the averaged probabilities of existence. For example, a shot-level probability of existence is determined by averaging the probabilities of existence of one entity for video frames in a video shot (i.e., a segment of video). The video frames of that video shot are each labeled with this shot-level probability of existence of the entity.

Using the labeled entities and associated probabilities of existence, the video hosting system 102 can take a number of different actions. For example, the video hosting system 102 can identify video frames within video content items that are most relevant to search queries containing one or more keywords, e.g., showing those frames in search results as representations of the video content items. The video hosting system 102 can further rank a set of video content items retrieved responsive to a search query according to the probabilities of existence of the entities labeled for video frames of each video content items. The video hosting system 102 can further use the labeled entities and associated probabilities of existence to identify video frames within video content items that are relevant to information describing the video content items, such as the title of the video.

Identifying probabilities of existence of entities allows a provider of the videos such as a media host (e.g., the video hosting system 102) to provide video content items that are most relevant to a user's search query based on the identified entities and the associated probabilities of existence. This identification further allows the media host to display information for a set of videos retrieved responsive to a search query in association with entities that are most relevant to the search query and the video frames that are most relevant to the search query, thus providing the users with additional information which they can use to assess the relevance of the videos to their search and identify videos they wish to view. For example, the media host displays thumbnails of most relevant segments of the videos.

It should be appreciated that the data processing operations of the video annotation engine 110, as described herein, inherently require a programmed computer system for their practical implementation. To simplify and clarify the present description, the content received and shared by the video hosting system 102 is generally referred to as videos, video files, or video items, as appropriate for the video-specific embodiments described herein, but it should be understood that the video hosting system 102 can receive and share content of any media type. This content may be referred to as media content items, media items, or items. Thus, the operations of the video annotation engine 110 described herein for annotating video files can be applied to any type of media content item, not only videos; other suitable type of content items include audio files (e.g. music, podcasts, audio books, and the like), documents, multimedia presentations, digital purchases of goods and services, and so forth.

Video Annotation

Figure 2:
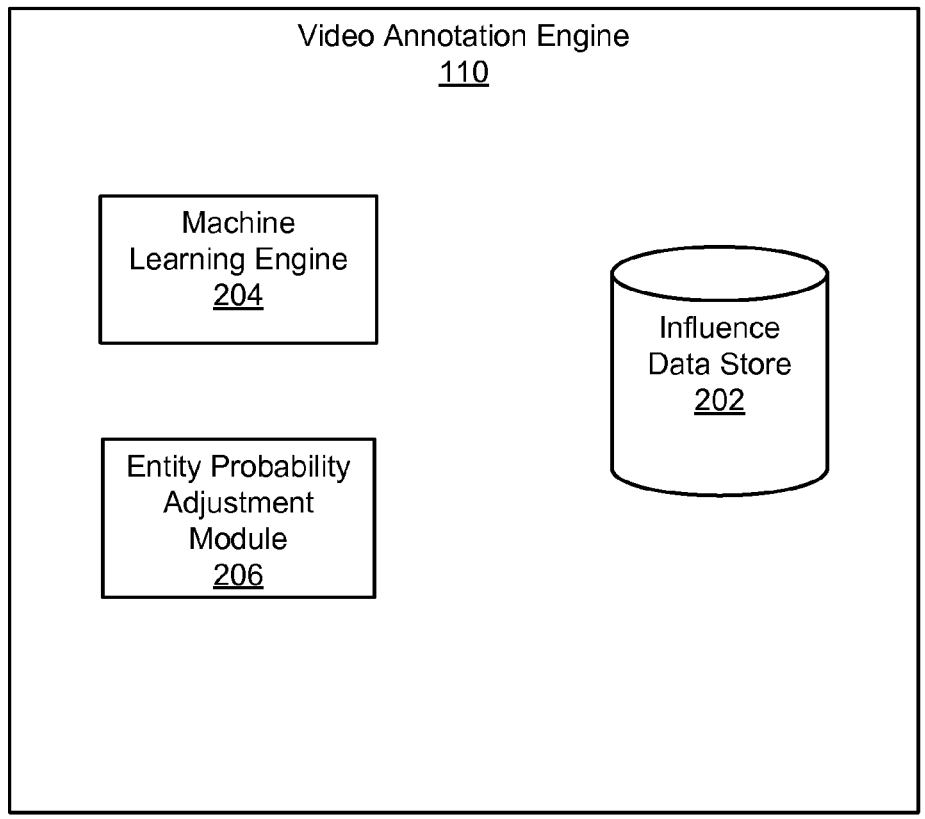
FIG. 2 is a block diagram of a video annotation engine according to one embodiment.

FIG. 2 is a high-level block diagram illustrating a detailed view of the video annotation engine 110, according to one embodiment. As shown in FIG. 2, the video annotation engine 110 includes several modules. Those of skill in the art will recognize that other embodiments can have different modules than the ones described here, and that the functionalities can be distributed among the modules in a different manner. In addition, the functions ascribed to the video annotation engine 110 can be performed by multiple engines. As illustrated, the video annotation engine 110 includes an influence data store 202, a machine learning engine 204, and an entity probability adjustment module 206.

The machine learning engine 204 measures the influence of metadata on the probability of existence of an entity (e.g., "machu picchu") and stores such influence in the influence data store 202. In some embodiments, the influence may be a scaling factor that adjusts the probability of existence of an entity. The machine learning engine 204 may use a semi-supervised learning approach to determine the influence. For each entity e that is determined to exist at a video frame (i.e., at time t of a video v), the machine learning engine 204 may train a classifier (e.g., a weight vector matrix $\{\Lambda\}$) using training data features such as the logarithm of probabilities of existence of entities $\lg x_{e,v}(t)$ at time t for the video v and metadata such as various retention statistics $R_v(t)$ at time t for the video v such as an average audience retention rate at a time point, video level features $V_{v,e}$ (e.g., lego centrality, relevance, topicality, or cowatch) of the entity e for the video v as a whole, and frame level features $F_{v,e}(t)$ of the entity e at time t for the video v. The frame level features may include various image classifiers identified for a frame, for example, by one or more machine-learned models. The frame level features may include a fusion score of the individual classifiers. The scaling factor (denoted $e^{(\Lambda m)}$) measures the influence of metadata on existence of an entity and may be based on a linear fusion model. For each entity e, the machine learning engine 204 determines a weight vector matrix $\{\Lambda\}$ for metadata and the probability of existence of entities $x_{e,v}(t)$. The weight vector matrix $\{\Lambda\}$ includes a weight vector for each type of metadata. For example, in one embodiment the weight vector matrix $\{\Lambda\}$ includes a weight vector $\Lambda_R$ for various retention statistics $R_v(t)$ at time t for the video v, a weight vector $\Lambda_1$ for video level feature $V_{v,e}$ of the entity e for the video v, and a weight vector $\Lambda_2$ for frame level feature $F_{v,e}(t)$ of the entity e at time t for the video v.

The entity probability adjustment module 206 determines, for each entity e that is identified to exist on a frame (i.e., the probability of existence $x_{e,v}(t)$ is greater than 0), an adjusted probability of existence $y_{e,v}(t)$ by adjusting the probability of existence $x_{e,v}(t)$ using metadata. The entity probability adjustment module 206 determines a scaling factor $e^{(\Lambda M)}$ based on the metadata and applies the scaling factor to the probability of existence $x_{e,v}(t)$. The scaling factor $e^{(\Lambda M)}$ takes into account all selected metadata that have an influence on the probability of existence of an entity on a video frame. More specifically, the weight vector matrix $\{\Lambda\}$ determined by the machine learning engine 204 and stored in the influence data store 202 is applied to metadata to determine the scaling factor $e^{(\Lambda M)}$. The entity probability adjustment module 206 determines the adjusted probability of existence $y_{e,v}(t)$ according to Equation (1):

$$y_{e,v}(t) = x_{e,v}(t) * e^{(\Lambda M)} \qquad (1)$$

In one embodiment, the weight vector matrix $\{\Lambda\}$ includes a retention statistics weight vector $\Lambda_R$, a video level feature weight vector $\Lambda_1$, and a frame level feature weight vector $\Lambda_2$. In this embodiment, the entity probability adjustment module 206 determines the adjusted probability of existence $y_{e,v}(t)$ according to Equation (2):

$$y_{e,v}(t) = x_{e,v}(t) * e^{(\Lambda_R R_v(t) + \Lambda_1' v_{v,e} + \Lambda_2' F_{v,e}(t))} \qquad (2),$$

where $R_v(t)$ are various retention statistics at time t for the video v, $V_{v,e}$ are video level features (e.g., lego centrality, relevance, topicality, or cowatch) of the entity e for the video v, and $F_{v,e}(t)$ are frame level features of the entity e at time t for the video v.

In some embodiments, the entity probability adjustment module 206 adjusts the probabilities of entities based on the importance of the entity in a video. The entity probability adjustment module 206 determines a scaling factor which is a ratio of the video-level centrality of the entity to the maximum probability of existence of the entity at the video and boosts the probability of existence of the entity at a frame using this factor. The entity probability adjustment module 206 may scale up the probability of existence of an entity if the entity is an important entity in a video, but does not scale down merely because the entity is not an important entity in the video. The more important an entity to a video is, the greater the amount that the entity probability adjustment module 206 scales up the probability of existence. The entity probability adjustment module 206 determines the probability of existence $y_{e,v}(t)$ according to Equation (3)

$$y_{e,v}(t) = \max\left(x_{e,v}(t) * \frac{c(e, v)}{x_{max}(e)}, x_{e,v}(t)\right), \qquad (3)$$

where $x_{max}(e)$ is the maximum probability of existence of an entity e in a video v, and $c(e, v)$ is the video-level centrality of the entity e. The video-level centrality of the entity is used to boost the probability of existence. The entity probability adjustment module 206 determines an interim adjusted probability of existence $$x_{e,v}(t) * \frac{c(e, v)}{x_{max}(e)}$$

by multiplying the probability of existence $x_{e,v}(t)$ and the scaling factor $$\frac{c(e, v)}{x_{max}(e)}.$$

The entity probability adjustment module 206 determines the adjusted probability of existence $y_{e,v}(t)$ as the greater between the interim probability of existence $$x_{e,v}(t) * \frac{c(e, v)}{x_{max}(e)}$$

and the probability of existence $x_{e,v}(t)$.

Figure 3:
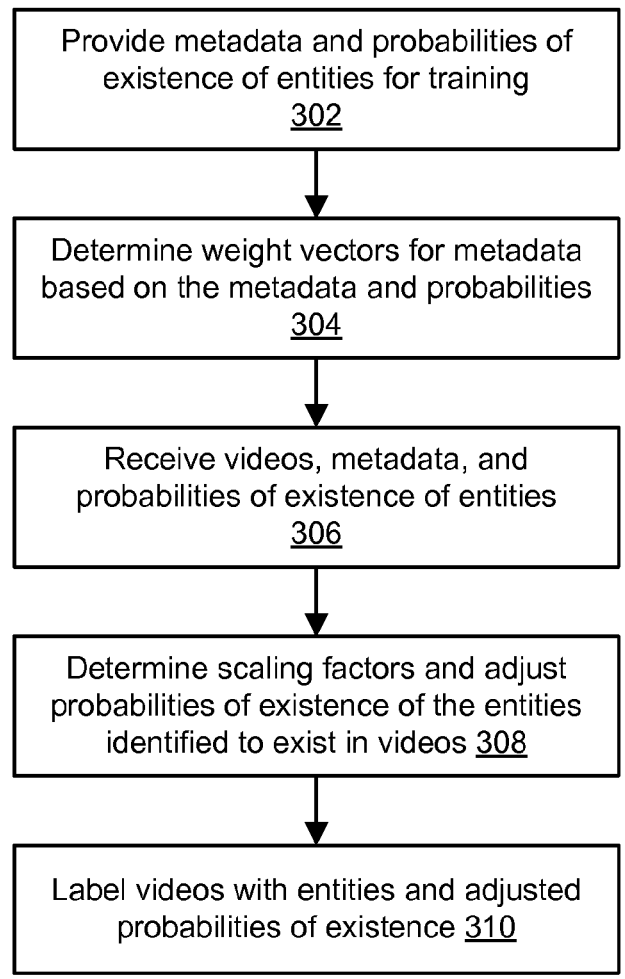
FIG. 3 is a flowchart illustrating a process for annotating videos with probabilities of existence of entities according to one embodiment.

FIG. 3 is a flowchart illustrating a process for annotating videos with probabilities of existence of entities, according to one embodiment. The method provides 302 training data comprising metadata associated with video items and probabilities of existence that are detected features that are correlated with the entity for training a machine learning model. Entities that are determined to exist in a video frame have probabilities of existence greater than zero. Metadata can be used to remove entities that do not exist in a video frame. For an entity, the machine learning model trains 304 a classifier for metadata using the training data. In one embodiment, the classifier is a weight vector matrix comprising weight vectors for metadata determined to have an influence on the probability of existence of the entity. The machine learning model evaluates the influence of each type of metadata on the probabilities of existence of entities as a weight vector and combines the influence of all selected types of metadata that affect the probabilities of existence.

The method receives 306 videos, metadata associated with the videos, and probabilities of existence of entities identified in frames of the videos. The method determines 308 scaling factors using the received video items, metadata, and probabilities of existence and applies scaling factors to adjust the probabilities of existence. In some embodiments, the method further uses the determined classifier to determine the scaling factors and multiplies the probabilities of existence by the scaling factors to determine adjusted probabilities of existence. In some embodiments, the method determines scaling factors for an entity as a ratio between the centrality of the entity and the maximum probability of existence. The method determines an adjusted probability of existence as the greater of the probability of existence and the probability of existence multiplied by the scaling factor. The method 310 labels the video frame with the entity and the adjusted probability of existence of the entity. The method may label each video frame of a video item with entities and the adjusted probability for each entity. Each video frame of a video item may be associated with the entities and the adjusted probabilities for the entities.

The method may further receive a search query from a user and identify and provide video files or video frames that satisfy the search query. The method may identify the video files or video frames by querying the labels of entities and the associated probabilities of existence of the entities on video frames. The method can identify video frames within video content items that are most relevant to search queries containing one or more keywords, e.g., showing those frames in search results as representations of the video content items. Further, the method can rank a set of video content items retrieved responsive to a search query according to the probabilities of existence of the entities labeled for video frames of each video content items. Further, the method can use the labeled entities and associated probabilities of existence to identify video frames within video content items that are relevant to information describing the video content items, such as the title of the video.

Additional Considerations

The present invention has been described in particular detail with respect to various embodiments, and those of skill in the art will appreciate that the invention may be practiced in other embodiments. In addition, those of skill in the art will appreciate the following aspects of the disclosure. First, the particular naming of the components, capitalization of terms, the attributes, data structures, or any other programming or structural aspect is not mandatory or significant, and the mechanisms that implement the invention or its features may have different names, formats, or protocols. Second, the system may be implemented via a combination of hardware and software, as described, or entirely in hardware elements. Third, the particular division of functionality between the various system components described herein is merely for purposes of example, and not mandatory; functions performed by a single system component may instead be performed by multiple components, and functions performed by multiple components may instead performed by a single component.

Some portions of above description describe the invention in terms of algorithms and symbolic representations of operations on information. These algorithmic descriptions and representations are used by those skilled in the data processing arts to most effectively convey the substance of their work to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules are embodied in software, firmware or hardware.

In addition, the terms used to describe various quantities, data values, and computations are understood to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or the like, refer to the action and processes of a computer system, or similar electronic computing device, that manipulates and transforms data represented as physical (electronic) quantities within the computer system memories or registers or other such information storage, transmission or display devices.

The present invention also relates to an apparatus for performing the operations herein. Furthermore, the computers referred to in the specification may include a single processor or may be architectures employing multiple processor designs for increased computing capability.

It is appreciated that a variety of programming languages may be used to implement the teachings of the present invention as described herein, and any references to specific languages are provided for disclosure of enablement and best mode of the present invention.

The present invention is well-suited to a wide variety of computer network systems over numerous topologies. Within this field, the configuration and management of large networks comprise storage devices and computers that are communicatively coupled to dissimilar computers and storage devices over a network, such as the Internet.

Finally, it should be noted that the language used in the specification has been principally selected for readability and instructional purposes, and may not have been selected to delineate or circumscribe the inventive subject matter. Accordingly, the disclosure of the present invention is intended to be illustrative, but not limiting, of the scope of the invention, which is set forth in the following claims.

The invention claimed is:

1. A computer-implemented method for annotating videos with entities and associated probabilities of existence of the entities within video frames, the method comprising:
   selecting an entity from a plurality of entities identifying characteristics of a video item, the video item having associated metadata;
   receiving probabilities of existence of the entity in video frames of the video item;
   selecting a video frame determined to comprise the entity responsive to determining the video frame having a probability of existence of the entity greater than zero;
   determining a scaling factor for the probability of existence of the entity using the metadata of the video item;
   determining an adjusted probability of existence of the entity by using the scaling factor to adjust the probability of existence of the entity; and
   labeling the video frame with the adjusted probability of existence.

2. The method of claim 1, wherein the metadata comprises a centrality of the entity indicating an importance of the entity, and the step of determining a scaling factor comprises:
   identifying a maximum probability of existence of the entity in the video; and
   calculating a ratio of the centrality of the entity to the maximum probability of existence of the entity in the video as the scaling factor.

3. The method of claim 2, further comprising:
   multiplying the probability of existence by the scaling factor to determine an interim probability of existence;
   comparing the interim probability of existence to the probability of existence, and;
   determining the adjusted probability of existence as a greater between the interim probability of existence and the probability of existence.

4. The method of claim 1, wherein the scaling factor is based on a linear fusion model, further comprising measuring a weight vector for each metadata, the weight vector representing an influence of the metadata on the probability of existence of the entity.

5. The method of claim 4, further comprising determining a classifier comprising a set of weight vectors, the set of weight vectors including a first weight vector for retention statistics for the video item, a weight vector for video-level features of the entity for the video item, and a weight vector for frame-level features of the entity for the video item.

6. The method of claim 1, wherein the scaling factor is based on a classifier determined by a machine learning model, the method further comprising providing training data comprising a set of video items, metadata associated with the set of video items, and probabilities of existence of items associated with the set of video items to the machine learning model.

7. The method of claim 1, further comprising:
   receiving a search query from a user; and
   providing the video item including the video frame to the user in response to determining that the search query matches the entity.

8. A system comprising:
   a processor for executing computer program instructions; and
   a non-transitory computer-readable storage medium comprising computer program instructions executable by the processor, the computer program instructions comprising:
   selecting an entity from a plurality of entities identifying characteristics of a video item, the video item having associated metadata;
   receiving probabilities of existence of the entity in video frames of the video item;
   selecting a video frame determined to comprise the entity responsive to determining the video frame having a probability of existence of the entity greater than zero;
   determining a scaling factor for the probability of existence of the entity using the metadata of the video item;
   determining an adjusted probability of existence of the entity by using the scaling factor to adjust the probability of existence of the entity; and
   labeling the video frame with the adjusted probability of existence.

9. The system of claim 8, wherein the metadata comprises a centrality of the entity indicating an importance of the entity, and the step of determining a scaling factor comprises:
   identifying a maximum probability of existence of the entity in the video; and
   calculating a ratio of the centrality of the entity to the maximum probability of existence of the entity in the video as the scaling factor.

10. The system of claim 9, wherein the computer program instructions further comprises:
    multiplying the probability of existence by the scaling factor to determine an interim probability of existence;
    comparing the interim probability of existence to the probability of existence, and;
    determining the adjusted probability of existence as a greater between the interim probability of existence and the probability of existence.

11. The system of claim 8, wherein the scaling factor is based on a linear fusion model, and wherein the computer program instructions further comprises measuring a weight vector for each metadata, the weight vector representing an influence of the metadata on the probability of existence of the entity.

12. The system of claim 11, wherein the computer program instructions further comprises determining a classifier comprising a set of weight vectors, the set of weight vectors including a first weight vector for retention statistics for the video item, a weight vector for video-level features of the entity for the video item, and a weight vector for frame-level features of the entity for the video item.

13. The system of claim 8, wherein the scaling factor is based on a classifier determined by a machine learning model, and wherein the computer program instructions further comprises providing training data comprising a set of video items, metadata associated with the set of video items, and probabilities of existence of items associated with the set of video items to the machine learning model.

14. The system of claim 8, wherein the computer program instructions further comprises:

receiving a search query from a user; and providing the video item including the video frame to the user in response to determining that the search query matches the entity.

15. A non-transitory computer-readable storage medium comprising computer program instructions executable by a processor, the computer program instructions comprising:

selecting an entity from a plurality of entities identifying characteristics of a video item, the video item having associated metadata;

receiving probabilities of existence of the entity in video frames of the video item;

selecting a video frame determined to comprise the entity responsive to determining the video frame having a probability of existence of the entity greater than zero;

determining a scaling factor for the probability of existence of the entity using the metadata of the video item;

determining an adjusted probability of existence of the entity by using the scaling factor to adjust the probability of existence of the entity; and labeling the video frame with the adjusted probability of existence.

16. The non-transitory computer-readable storage medium of claim 15, wherein the metadata comprises a centrality of the entity indicating an importance of the entity, and the step of determining a scaling factor comprises:

identifying a maximum probability of existence of the entity in the video; and calculating a ratio of the centrality of the entity to the maximum probability of existence of the entity in the video as the scaling factor.

17. The non-transitory computer-readable storage medium of claim 16, wherein the computer program instructions further comprises:

multiplying the probability of existence by the scaling factor to determine an interim probability of existence;

comparing the interim probability of existence to the probability of existence, and;

determining the adjusted probability of existence as a greater between the interim probability of existence and the probability of existence.

18. The non-transitory computer-readable storage medium of claim 15, wherein the scaling factor is based on a linear fusion model, and wherein the computer program instructions further comprises measuring a weight vector for each metadata, the weight vector representing an influence of the metadata on the probability of existence of the entity.

19. The non-transitory computer-readable storage medium of claim 18, wherein the computer program instructions further comprises determining a classifier comprising a set of weight vectors, the set of weight vectors including a first weight vector for retention statistics for the video item, a weight vector for video-level features of the entity for the video item, and a weight vector for frame-level features of the entity for the video item.

20. The non-transitory computer-readable storage medium of claim 15, wherein the scaling factor is based on a classifier determined by a machine learning model, and wherein the computer program instructions further comprises providing training data comprising a set of video items, metadata associated with the set of video items, and probabilities of existence of items associated with the set of video items to the machine learning model.

21. The non-transitory computer-readable storage medium of claim 15, wherein the computer program instructions further comprises:

receiving a search query from a user; and providing the video item including the video frame to the user in response to determining that the search query matches the entity.

* * * * *